United States Patent Office 3,254,179
Patented May 31, 1966

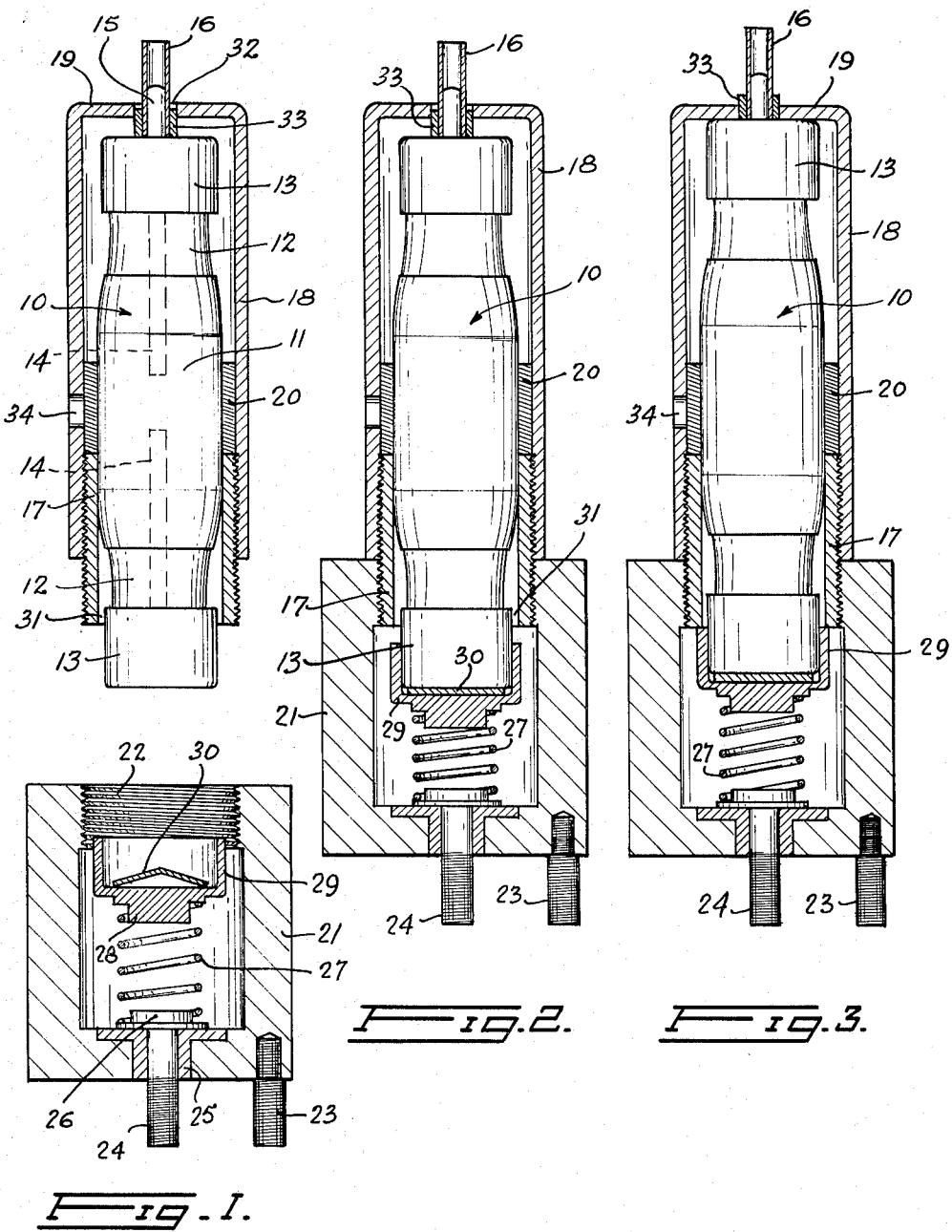

3,254,179
MOUNTING FOR COMMUNICATION LINE PROTECTOR
Frank B. Howard, Ottawa, Ontario, Canada, assignor to Northern Electric Company Limited, Montreal, Quebec, Canada
Filed Jan. 7, 1964, Ser. No. 336,218
8 Claims. (Cl. 200—115)

This invention relates to improvements in mounting assemblies for gas-filled protectors of the type used in connection with communication lines.

It is necessary to protect telephone, control, and like communication lines against voltages induced in them by lightning flashes and switching or fault surges in adjacent power lines. Such voltages often exceed the normal operating voltages of the line, and if protection were not provided, there would be potential danger to personnel as well as risk of damage to valuable telephone and other communication equipment.

For these reasons, there have come into conventional use devices known as protectors (also known as spark gap devices), which are connected between the two lines of of a telephone pair, or between each line and ground, or between all three of these points. The protector is designed to present an open circuit at normal operating voltages, but to provide a low impedance path for conducting to ground undesired currents at voltages above those that the line is required to encounter during normal operation.

One type of such protector is the so-called gas-filled protector, one form of which is illustrated in U.S. Patent No. 2,620,453, issued December 2, 1962, to N. C. Beese et al. a well known commercial form of such a protector (illustrated at 10 in the drawings accompanying this application) consists of a three-electrode device of generally elongated cylindrical shape comprising an outer metal tube disposed centrally of the device and rigidly mechanically connected by insulating ceramic spacers to a pair of metallic end caps. From each of the end caps a small diameter cylindrical electrode projects towards the centre of the device along the longitudinal axis thereof. The free ends of these two electrodes thus extend inwardly from the end caps to face each other at the centre of the device across a gap, the length of which is accurately predetermined. Such inner electrodoes are also spaced a carefully predetermined distance from the centrally located, outer metal tube which forms the third electrode. The device is filled with a suitable inert gas, such as argon, at a convenient pressure, typically about a third of an atmosphere. This type of protector is designed to be mounted with the central outer electrode connected to ground and each of the end caps connected to a respective line of a telephone pair. On the occurrence of an overvoltage in either line, relative to ground, and/or across the lines, one or more of the gaps between the inner electrodes themselves will break down and temporarily act as a low impedance between the lines and ground. Upon the disappearance of the overvoltage, the device will recover its non-conducting condition and again present a high impedance to the lines and between the lines and ground. A gas-filled protector can normally withstand a large number of such operations without any significant change to its performance characteristics, a feature which makes the gas-filled protector superior in many respects to the other principal type of protector, the carbon-block protector, which latter has to be replace frequently, because of its tendency to deteriorate after a number of operations.

Numerous variations have been proposed from time to time in the details of construction of gas-filled protectors. Some protectors are of the two electrode type having one grounding electrode and only one line electrode. A telephone pair is then protected by two such protectors connected one between each respective line and ground. But the more modern form of gas-filled protector is the three-electrode device. The present invention, insofar as it is concerned with an improved mounting for a gas-filled protector, is not concerned with such variations in the internal structure of the protector itself. Suffice to say that, while the preferred forms of mounting described specifically below are illustrated in use with one particular construction of protector, the invention in its broad aspects includes mountings that are used with (and which may be specially dimensioned to cooperate with) any form of gas-filled protector that includes at least two electrodes, an electrode serving as a grounding connection, and at least one electrode for connection to a line conductor.

Consideration must also be given to the performance of protectors under very heavy current conditions. If an overvoltage persists, the current flowing through the protector may be sufficient to destroy it, or seriously damage it. The question then arises of the effect that this damage or destruction of the protector will have on its function as a protector. Undoubtedly the protector will require replacement as soon as possible, but, in the meantime, it is important that the device should "fail safe," in the sense that, if failing, it should be sure to connect the line or lines that it is protecting to ground. It should under no conditions fail open, leaving the line or lines unprotected.

Gas-filled protectors of the type described above have been designed with this object in view. Theoretically, when a gas-filled protector is so heated by excess current that its metal parts soften or melt, the inner electrode or electrodes will collapse to make contact with the outer tube electrode and establish a permanent short circuit from the inner electrode or electrodes to ground. Experience has shown, however, that this theoretically inherent fail safe feature is not entirely dependable in practice. Completely reliable operation is so vital in a protector that a design which will fail safe most of the time is not good enough. For this reason the adoption of the gas-filled type of protector has not been as universal as its otherwise very favourable operating characteristics would recommend. The carbon-block type of protector, although less desirable in some of its features (mainly durability), has better inherent fail safe characteristic.

A fail safe mounting for gas-filled protectors has been proposed in Lemieux United States patent application Serial No. 336,219, filed concurrently herewith.

The object of the present invention is to provide certain improvements over the Lemieux construction.

Lemieux employs a low melting point material to detect overheating of the protector and to release shorting means which then positively connects the line terminals to ground. In the present invention, the low melting point material chosen is also a solder, and it is given a dual function to perform, that is both to act as a temperature sensitive element, and prior to melting to bond the shorting means positively in its unreleased position. Another feature of one form of the present invention is use of the protector itself as at least part of the movable shorting means.

These and other features of the present invention will become apparent from the description which follows, in which three embodiments of the invention are illustrated. The constructions are intended as examples only of the invention, and not as limiting to its scope which is defined in the appended claims.

In the drawings:

FIGURE 1 is an exploded, longitudinal section of a first construction;

FIGURE 2 shows the construction of FIGURE 1 fully assembled;

FIGURE 3 is a similar view of the FIGURE 2 construction in the fail safe position;

Figure 4:
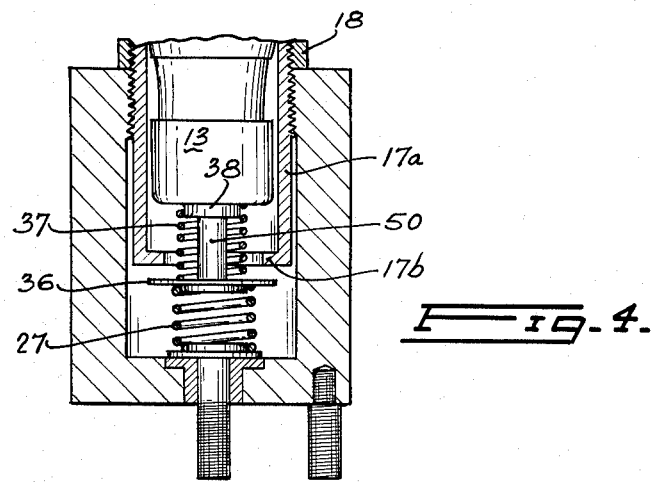
FIGURE 4 is a similar fragmentary section of an alternative construction.

With reference to FIGURES 1 to 3, there is illustrated a conventional gas-filled, three electrode protector 10 having a centrally located, outer, tubular grounding electrode 11 structurally connected by insulating ceramic spacers 12 to end caps 13 from which inner electrodes 14 project towards the centre of the device. The protector 10 is evacuated, filled to a sub-atmospheric pressure with an inert gas, and finally sealed by a metal tit 15 which communicates with the interior of the device. A tubular terminal 16 surrounding the tit 15 projects beyond the end of the protector for connection in a conventional manner to a flexible lead.

The outer electrode 11 is a sliding fit (about 10 thousandths of an inch difference in diameter) in a sleeve 17 threaded on its outer surface to receive an outer metal tube 18, the lower part of which tube is threaded to engage the sleeve 17, and the upper part of which tube surrounds the upper part of the protector 10. At its upper end the tube 18 terminates in an annular inturned flange 19 defining a central hole through which the terminal 16 projects. A sleeve 33 of coloured plastic insulating material surrounds the terminal 16 and is a sliding fit in the hole in flange 19, although, in the operating condition of the device shown in FIGURES 1 and 2, the sleeve 33 projects only part way into this hole, leaving an annular air gap 32 between the terminal 16 and the flange 19. A similar annular air gap 31 exists between the lower end cap 13 and the lower end of the sleeve 17.

A body of low melting point solder material 20 is located as an annular collar between the electrode 11 and the inside surface of the tube 18 immediately above the upper end of the sleeve 17. Part of the assembly process of the "capsule" so far described is to apply heat to the exterior of the device immediately outside the central area of the tube 18 in a sufficient amount to soften the solder 20, which, on cooling, bonds the parts together in the position shown.

This "capsule" is used in association with a fixed mounting consisting of a metal base 21 threaded at 22 to receive the lower end of the sleeve 17, as demonstrated in FIGURE 2. Base 21 is grounded at 23. A line terminal 24, insulated from the base 21 at 25, is connected to a metal disc 26 supporting a coil spring 27. The upper end of spring 27 engages the base 28 of a metal cap 29 arranged to receive an end cap 13 of the protector 10, as FIGURE 2 also shows. A light leaf spring 30 is located in the cap 29. When the mounting and capsule are assembled the spring 30 is pressed flat and the spring 27 is compressed.

In operation, terminals 16 and 24 are connected to the respective lines of a telephone pair, these terminals being electrically common with the end caps 13 and hence with the two electrodes 14. Terminal 23, and hence base 21, sleeve 17, tube 18 and the outer protector electrode 11, are grounded. The air gaps 31 and 32 will normally be too wide to anticipate the function of the protector. The protector will operate and provide a circuit to ground at a line overvoltage lower than the voltage required to break down the air gaps. Nevertheless these air gaps provide some back-up protection for excessive voltage surges.

Under heavy excess current conditions a large amount of heat is generated in the protector 10 and this heat is transmitted through the outer electrode 11 to melt the body of solder 20. Such heating, if sustained, would be sufficient soon to damage or destroy the protector 10. But it will not have an opportunity to do so, because of the operation of the fail safe mechanism. Conditions will be chosen so that the solder melts in advance of the point where a steadily building up temperature would damage the protector. In this respect, the system is similar in operation to that described in the Lemieux application above referred to.

When the solder 20 melts, it releases its binding grip on the protector 10 which is then forced longitudinally in the tube 18 by the spring 27, as shown in FIGURE 3. This movement has the effect of closing gaps 31 and 32, the top edge of cap 29 bearing against the bottom edge of sleeve 17 and the upper end cap 13 bearing against the flange 19 of the tube 18. Ideally, these two sets of bearing contacts should close uniformly. The tolerances are so arranged that any dimensional variations from such ideal will cause the cap 29 and sleeve 17 to engage first. Then, any remaining space between the cap 13 and flange 19 will be taken up by movement of the protector caused by upward pressure of the spring 30. FIGURE 3 has shown no discernible expansion of spring 30 to be necessary in this instance to ensure shorting of each of the line terminals 16, 24 to ground.

The sleeve 33 also acts as a release indicator since it now projects beyond the end of the tube 18 to signal that the assembly has released. FIGURE 3 shows the solder 20 still in place after having melted and rehardened.

Should over-heating in the base 21 by heavy currents in the spring 27 and at the contact points at each end of the spring, be great enough to produce a potentially explosive air pressure in the base 21, such air can escape along the walls of the protector 10 to force a hole through the molten solder 20 and vent to atmosphere through a hole 34 provided for this purpose in the tube 18. Solder 20 normally occludes the hole 34, thus permitting this safety vent to exist without normally exposing the inner parts of the assembly to atmospheric conditions. The sleeve 33 is a sufficiently close fit in the flange 19 to exclude dust and atmospheric changes in humidity.

FIGURE 4 shows an alternative arrangement of shorting means. In this case, sleeve 17a terminates at its lower end in inturned flange 17b. The main compression spring 27 acts upwardly on a disc 36. The spring 30 is replaced by a light coil spring 37 extending between the disc 36 and the end cap 13 of the protector. Soldered to the end cap 13 is a cylindrical metallic member having a larger diameter portion 38 holding the spring 37 in position and a smaller diameter portion 50. The portion 50 touches the disc 36 when the spring 37 is compressed thus avoiding the need to pass current through this light spring. On release, which takes place as before, the body of solder (not shown) which is positioned between the protector 10 and the outer tube 18 as in FIGURE 1, melts and the disc 36 shorts line terminal 24 to ground through flange 17b. Spring 37 ensures that the upper end cap 13 will short the line terminal 16 to ground through flange 19.

Figure 5:
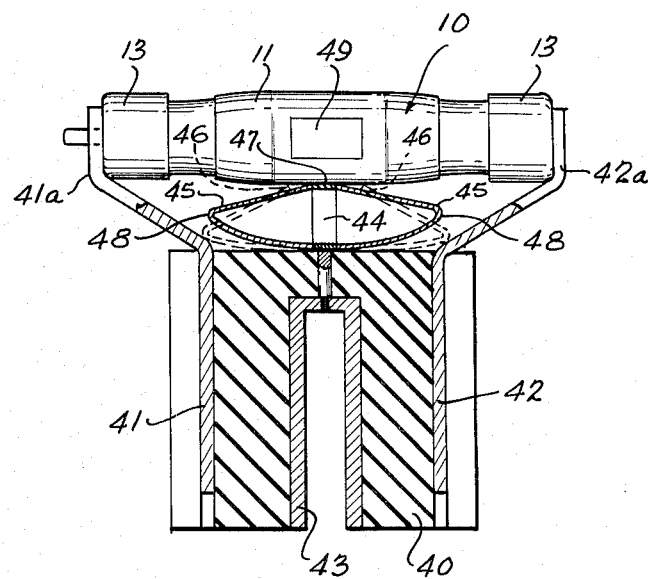
FIGURE 5 is a side, partly sectioned view of a third construction.

The third construction shown in FIGURE 5 employs an insulating base 40 supporting line terminals 41 and 42 and a ground terminal 43 in a manner adapted to establish contact with corresponding parts (not shown) as a plug-in type connector. Line terminals 41, 42 include portions 41a, 42a for firmly supporting a protector 10 while establishing electrical contact with the end caps 13 thereof. Mounted on a post 44 connected to the ground terminal 43 is a double armed, bent spring 45, the free ends 46 of which are normally (solid lines) held inwardly against the spring stress by being embedded in a body of solder 47 disposed between the upper end of the post 44 and the central electrode 11 of the protector 10. Heating and melting of the solder 47 will release spring ends 46. The spring 45 will take up the broken line position with its elbows 48 bearing against respective line terminals 41, 42. Thus, in this construction, the spring forms the shorting means, since it is itself permanently connected to the ground terminal 43. A patch of heat sensitive paint 49 on the protector 10 acts as a release indicator by changing colour when an excessive temperature is reached. Such heat sensitive paints are known.

The material employed as the low melting point solder may conveniently be the alloy of bismuth, lead, tin and cadmium known under the trademark Cerrobend, which melts at 158° F. and is an effective solder. Other known solder alloys can be chosen, depending upon the exact melting point required, and in this connection it should be made clear that the term "solder" as used herein includes the modern resin based electrically conducting materials which will bond parts together at atmospheric temperatures and soften at appropriate elevated temperatures to release such bond.

As mentioned above, the invention is also applicable to use with a two-electrode protector. As in the three-electrode case, the solder material will be located in close thermal contact with an area of the protector in which any overheating will be best observable, and shorting means (including the protector itself, as in FIGURES 1 to 4; or a separate structure, such as the spring of FIGURE 5 will be released by the solder when it melts, to short the line and ground terminals together.

I claim:

1. A fail safe protector assembly for the protection of telephone and like communication lines, comprising:
    (a) a gas-filled protector having at least two electrodes constituting a spark gap,
    (b) a fixed structure supporting said protector,
    (c) at least two terminals mounted on the fixed structure,
    (d) means forming part of the fixed structure electrically connecting said terminals to respective ones of said electrodes of the protector,
    (e) shorting means movable relatively to said fixed structure between one position electrically connecting said terminals together and another position electrically isolating said terminals from each other,
    (f) resilient means mounted on said fixed structure urging said shorting means to said one position,
    (g) a body of low melting point solder material,
    (h) and means positively bonding said body of solder material to said shorting means to anchor the shorting means relative to said fixed structure in said other position, said body being in close thermal contact with a heat generating area of said protector for melting of said body and release of said shorting means upon overheating of said protector area.

2. A fail safe assembly for the protection of telephone and like communication lines, comprising:
    (a) a gas-filled protector having at least one line electrode and a ground electrode constituting a spark gap,
    (b) a fixed structure including a ground terminal secured to said fixed structure,
    (c) means mounting said protector in said fixed structure to be movable relatively thereto between one position in which said line electrode is electrically connected to said ground terminal and another position in which said line electrode is electrically isolated from said ground terminal,
    (d) resilient means urging said protector to said one position,
    (e) and a body of low melting point solder material and means positively bonding said body of solder material to said protector and positively bonding said body of solder material to said ground terminal to anchor said protector relatively to said fixed structure in said other position until release of said protector by said body of solder material upon melting thereof by overheating of said protector.

3. A fail safe assembly for the protection of telephone and like communication lines, comprising:
    (a) a gas-filled protector in the form of an elongated cylindrical device having
        (i) a centrally located, outer, tubular electrode,
        (ii) a pair of end caps,
        (iii) electrical insulating means mechanically connecting said outer electrode and each of said end caps,
        (iv) and a pair of inner electrodes each extending axially along the device inwardly thereof towards each other from a respective end cap to form spark gaps with each other and with the outer electrode,
    (b) a fixed structure including a ground terminal secured to said fixed structure,
    (c) means mounting said protector in said fixed structure including a member electrical connected to one of said end caps and resilient means in compression between said member and said one end cap,
    (d) said mounting means mounting said protector in said fixed structure to be movable relative thereto between one position in which said member and the other end cap are in electrical contact with said ground terminal and another position in which said member and said other end cap are electrically isolated from said ground terminal,
    (e) further resilient means acting on said member to urge said protector to said one position,
    (f) and a body of low melting point solder material and means positively bonding said body of solder material to the outer electrode of said protector and positively bonding said body of solder material to said ground terminal to establish an electrical connection therebetween, said body anchoring said protector relatively to said fixed structure in said other position, until release of said protector by said body of solder material upon melting thereof by overheating of said outer electrode.

4. A fail safe assembly for the protection of telephone and like communication lines, comprising:
    (a) a metal tube,
    (b) a protector having at least one line electrode and a ground electrode constituting a spark gap,
    (c) said tube including means mounting said protector axially slidably in said tube between two positions, in a first of which positions said line electrode is electrode is electrically isolated from said tube and in the second of which positions said line electrode is electrically connected to said tube,
    (d) a body of low melting point solder material and means positively bonding said body of solder material to said protector and positively bonding said body of solder material to said tube to hold the protector in said tube in said first position, said body of solder material being in close thermal contact with a heat generating area of said protector,
    (e) said tube including means for mounting the assembly in a base having resilient means to urge the protector towards said second position.

5. A fail safe assembly for the protection of telephone and like communication lines comprising:
    (a) a gas-filled protector in the form of an elongated cylindrical device having
        (i) a centrally located, outer, tubular electrode,
        (ii) a pair of end caps,
        (iii) electrical insulating means mechanically connecting said outer electrode and each of said end caps,
        (iv) and a pair of inner electrodes each extending axially along the device inwardly thereof towards each other from a respective end cap to form spark gaps with each other and with the outer electrode, (b) a metal tube, said tube including means mounting said protector axially slidable in said tube between two positions, in a first of which positions said end caps are both electrically isolated from said tube, and in the second of which positions, said end caps are both electrically connected to said tube, (c) a body of low melting point solder material and means positively bonding said body of solder material to said protector and positively bonding said body of solder material to said tube to hold the protector in the tube in said first position, said body of solder material being in close thermal contact with a heat generating area of said protector, (d) said tube including means for mounting the assembly in a base having resilient means to urge the protector towards said second position.

6. An assembly according to claim 5, including release indicating means connected to said protector and projecting outwardly of said tube when said protector is in said second position.

7. A fail safe mounting for a gas-filled protector of the type employed for the protection of telephone and like communication lines, said protector consisting of an elongated cylindrical device comprising a centrally located, outer, tubular electrode and a pair of end caps electrically isolated from said centrally located outer electrode and each supporting an inner electrode extending axially along the device inwardly thereof towards each other to form spark gaps with each other and with the outer electrode, said mounting comprising a base, (a) a pair of line terminals mounted on said base electrically isolated from each other, (b) a ground terminal mounted on said base electrically isolated from both said line terminals, (c) means for supporting a protector of the above described type on the base, said means including means for electrically connecting said line terminals to respective said end caps and for electrically connecting said ground terminal to said outer electrode, (d) shorting means electrically connected to said ground terminal, said shorting means being movably mounted on the base between one position in which said shorting means makes electrical contact with both said line terminals and another position in which said shorting means is electrically isolated from both said line terminals, (e) resilient means acting between said shorting means and said base urging said shorting means to said one position, (f) and a body of low melting point solder material and means positively bonding said body of solder material to said shorting means to anchor the same reltatively to said line terminals in said other position, said body bearing against said outer electrode for melting of said body and release of said shorting means upon overheating of said outer electrode.

8. A fail safe mounting for a gas-filled protector of the type employed for the protection of telephone and like communication lines, said protector consisting of an elongated cylindrical device comprising a centrally located, outer, tubular electrode and a pair of end caps electrically isolated from said centrally located outer electrode and each supporting an inner electrode extending axially along the device inwardly thereof towards each other to form spark gaps with each other and with the outer electrode, said mounting comprising a base, (a) a pair of line terminals mounted on said base electrically isolated from each other, (b) a ground terminal mounted on said base electrically isolated from both said line terminals, (c) means for supporting a said protector in the mounting, said means including means for electrically connecting said line terminals to respective said end caps and for electrically connecting said ground terminal to said outer electrode, (d) spring means electrically connected to said ground terminal, said spring means having a released position in which it makes electrical contact with both said line terminals and a stressed position in which it is electrically isolated from both said line terminals, (e) and a body of low melting point solder material and means positively bonding said body of solder material to said spring means to anchor the same relatively to the line terminals in said stressed position, said body bearing against said outer electrode for melting of said body and release of said spring means upon overheating of said outer electrode.

References Cited by the Examiner
UNITED STATES PATENTS

| | | | |
|---|---|---|---|
| 1,352,117 | 9/1920 | Davis | 200—115 |
| 2,504,804 | 4/1950 | Clarke | 317—61 X |

BERNARD A. GILHEANY, *Primary Examiner.*

H. A. LEWITTER, *Assistant Examiner.*